United States Patent [19]
Seita

[11] Patent Number: 6,023,290
[45] Date of Patent: *Feb. 8, 2000

[54] DISPLAY APPARATUS, AUDIO-VIDEO NAVIGATION SYSTEM, DISPLAYING METHOD AND CAR

[75] Inventor: Kazuhisa Seita, Kanagawa, Japan

[73] Assignee: Sony Corporation, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/636,136

[22] Filed: Apr. 22, 1996

[30]  Foreign Application Priority Data

Apr. 25, 1995 [JP] Japan .................................. P07-124328

[51] Int. Cl.⁷ ..................................................... H04N 7/18
[52] U.S. Cl. ........................... 348/118; 348/113; 348/116; 455/90; 455/91
[58] Field of Search ..................................... 348/113, 116, 348/118, 115; 455/90, 91, 186.1; 340/361, 937, 438, 938

[56] References Cited

U.S. PATENT DOCUMENTS

| | | | |
|---|---|---|---|
| 5,086,510 | 2/1992 | Guenther et al. | 455/90 |
| 5,130,709 | 7/1992 | Toyama et al. | 340/937 |
| 5,289,167 | 2/1994 | Kurosawa et al. | 340/461 |
| 5,381,338 | 1/1995 | Wysocki et al. | 348/116 |
| 5,436,851 | 7/1995 | Shimotsuma et al. | 364/514 |
| 5,470,233 | 11/1995 | Fruchterman et al. | 434/112 |
| 5,491,785 | 2/1996 | Robson et al. | 395/162 |
| 5,515,042 | 5/1996 | Nelson | 340/937 |
| 5,594,953 | 1/1997 | Ross et al. | 455/89 |
| 5,732,338 | 3/1998 | Schwob | 455/186.1 |

*Primary Examiner*—Anand S. Rao
*Attorney, Agent, or Firm*—Jay H. Maioli

[57]  ABSTRACT

An audio-video navigation systems that permits performing a navigation while reproducing a disc, by displaying an operation status of the disc player and analyzed level of each frequency component of the signal are superimposed onto a map for navigation. When performing the navigation while receiving by a tuner, the display of the receiving state of the tuner and analyzed level of each frequency component of the signal are superimposed onto the map for navigation.

10 Claims, 12 Drawing Sheets

| AREA#1<br><br>FRAME MEMORY | AREA#2<br><br>FUNCTION KEY | AREA#3<br><br>CD UNIT |
|---|---|---|
| AREA#4<br><br>TUNER UNIT | AREA#5 | AREA#6<br><br>NAVIGATION |
| AREA#7 | AREA#8 | AREA#9 |

DISPLAY APPARATUS, AUDIO-VIDEO NAVIGATION SYSTEM, DISPLAYING METHOD AND CAR

BACKGROUND OF THE INVENTION

1. Field of the Invention

The present invention relates to an audiovideo navigation system and a display apparatus which is suitable for use in such a system.

1. Description of the Related Art

A vehicle-mounted audio system which is used to enjoy an audio reproduction in an automobile is widespread. A vehicle-mounted television receiver is also being widespread in association with a development of a small liquid crystal display. Further, a car navigation system for measuring the present position of the car by using some satellites and displaying it on a map is being widespread. An audio-video navigation equipments system can incorprate such equipments. That is, the audio-video navigation system includes: a navigation system for measuring the present position of the car by using, for example, satellites; a CD player for reproducing a compact disc for music; a tuner for receiving an FM or AM broadcast, or, further, a television broadcast; and the like. In the system, there is a console unit attached to, for example, a dashboard in the vehicle. In the console unit, a display and operation keys are arranged. During the navigation, a map is displayed on the display of the console unit. During the reception of the television broadcast, the reproduced picture of the television is displayed on it. During the reproduction of the compact disc, music piece number, and the like are displayed on it. During the reception of the FM/AM broadcast, the receiving frequency and the like are displayed on it. Further, analyzed level of each frequency component of the signal can be displayed on it during the reproduction of the compact disc or the reception of the FM/AM broadcast. As mentioned above, in the audio-video navigation system, there is the display in the console unit, a map is displayed on it at the time of the navigation, a received picture of the television is displayed on it at the time of the reception of the television broadcast, and operation status are displayed on it at the time of the reproduction of the disc player. Further, the analyzed level of each frequency component of the signal is displayed on it at the time of the reproduction of the compact disc or the reception of the FM/AM broadcast.

In the audio-video navigation system, the information of these equipments is displayed on it individually. Therefore, for example, there is a problem such that in case of performing a navigation while reproducing the disc, the operation status of the disc player cannot be confirmed at a glance.

That is, there is a case where the user wants to perform the navigation while reproducing the disc. In this case, only the map for a navigation is displayed on the display, so that the operation status of the disc player cannot be confirmed during the navigation. In order to confirm the operation status of the disc player, therefore, the operation to stop the navigating function is required. But, such an operation is troublesome and, when the operation status of the disc player is displayed on the display, the navigation cannot be executed for such a displaying time.

OBJECTS AND SUMMARY OF THE INVENTION

It is, therefore, an object of the invention to provide an audio-video navigation system which can confirm an operation status of a disc player or a tuner while displaying a map for a navigation.

According to the invention, there is provided an audio-video navigation system for displaying plural information simultaneously comprising; a displaying means for displaying an image, a navigation system for generating navigating information, an audio-video operating system for generating an image of operation status of an audio and/or video equipment, and an image mixing means for generating mixed image information made by the navigation and audio-video operating means wherein an image of the navigating information includes an image of the operation status of the audio and/or video equipment.

DETAILED DESCRIPTION OF THE PREFERRED EMBODIMENTS

Figure 1:
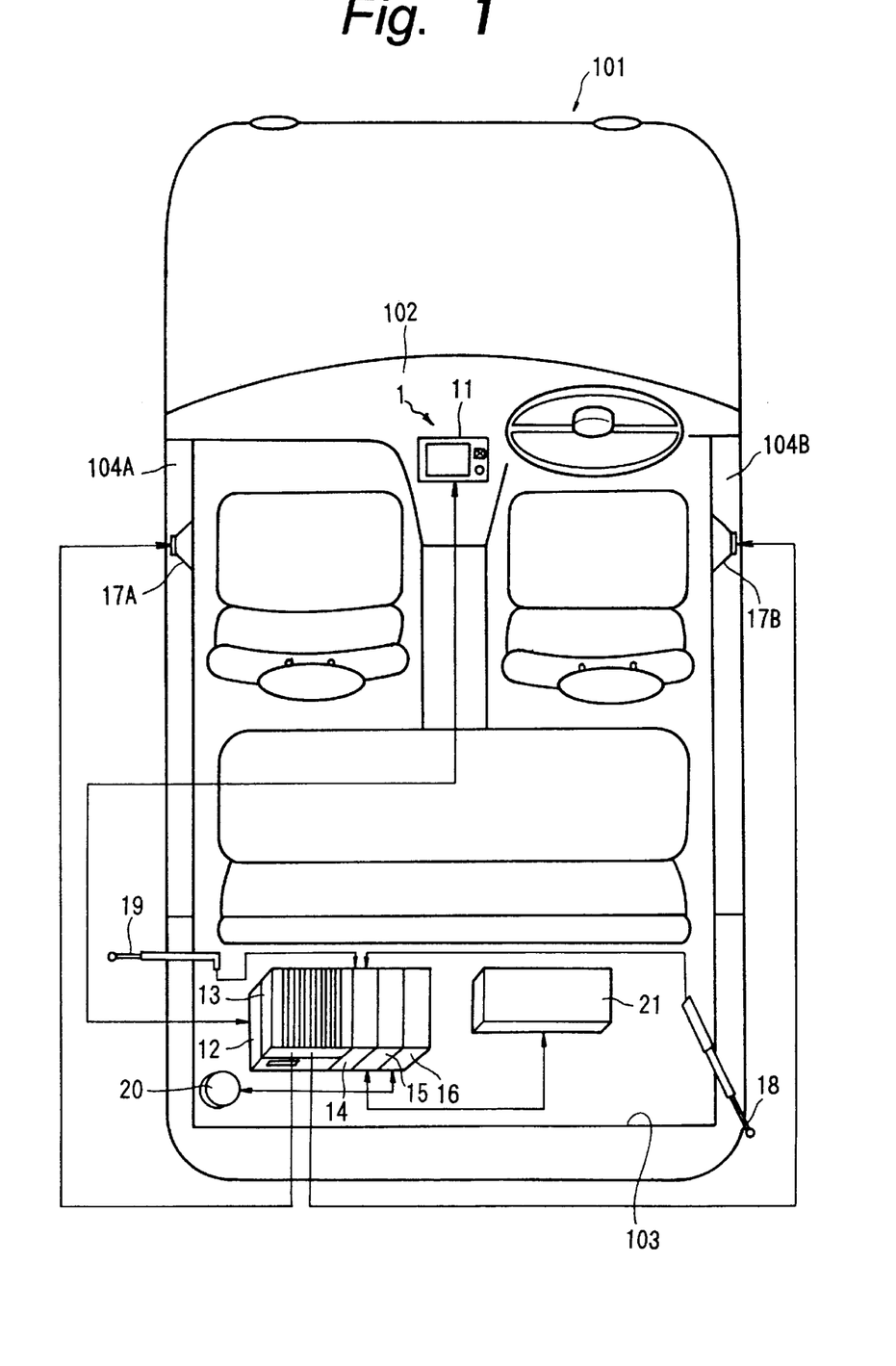
FIG. 1 is a perspective view showing the construction of a system to which the invention is applied.

An embodiment will now be described hereinbelow with reference to the drawings. FIG. 1 shows an example of a construction of an audio-video car navigation system to which the invention is applied. In FIG. 1, reference numeral 11 denotes a console unit. The console unit 11 is attached to, for example, a dashboard 102 of a vehicle 101.

Figure 2:
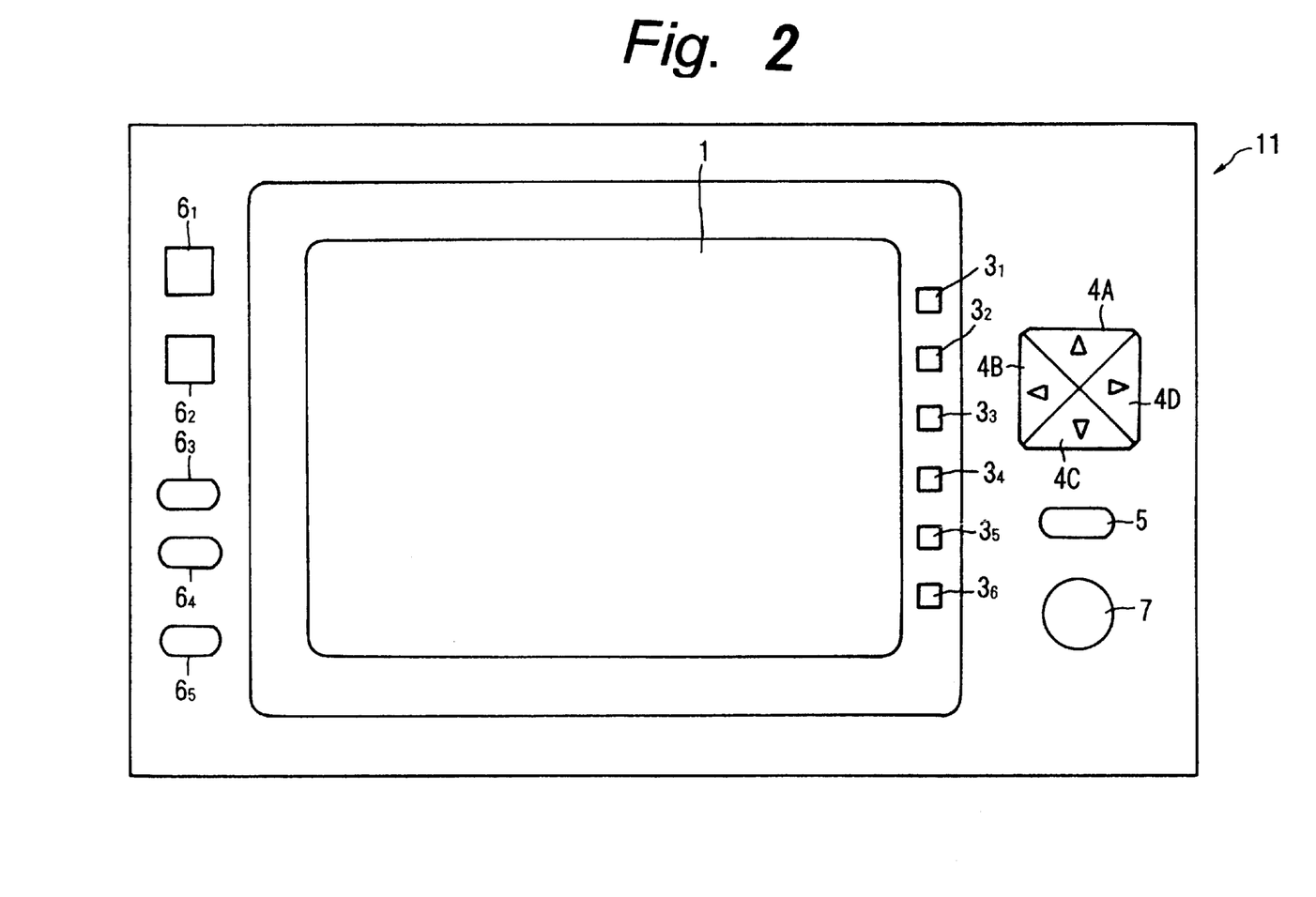
FIG. 2 is a plan view showing a construction of a console unit in the system to which the invention is applied.

On the console unit 11, as shown in FIG. 2, a liquid crystal display 1 is provided and function keys $3_1$ to $3_6$, cursor keys 4A to 4D, a display switching key 5, a map key $6_1$, a mode key $6_2$, an adjust key $6_3$, a help key $6_4$, a mute key $6_5$, and the like are also arranged. A volume adjusting dial 7 is also arranged on the console unit 11. On the liquid crystal display 1, an operating status is displayed and an electronic map in the navigation or a received picture at the time of the television reception is also displayed.

In FIG. 1, reference numeral 12 denotes a main unit; 13 a power unit; 14 a tuner unit; 15 a CD unit; and 16 a GPS unit. The main unit 12, power unit 13, tuner unit 14, CD unit 15, and GPS unit 16 are integratedly coupled. In this state, they are arranged in, for example, a trunk 103.

The main unit 12 has a main CPU, a sub CPU, a graphics drawing-display circuit, and the like and manages the operation of the whole system. The main unit 12 and the console unit 11 are connected. An input from an operation key of the console unit 11 is supplied to the main unit 12. An image signal from the main unit 12 is supplied to the liquid crystal display 1 of the console unit 11.

The power unit 13 has a power supply unit, a DSP preamplifier unit, and a power amplifier. The DSP preamplifier unit has functions such as sound quality/volume adjustment, surrounding, parametric equalizer, and the like. Audio outputs of the power unit 13 are supplied to, for example, speakers 17A and 17B attached to left and right door panels 104A and 104B of the vehicle 101.

The tuner unit 14 demodulates a reception signal of an AM or FM broadcast. Further, the tuner unit 14 can demodulate a television signal. A reception signal from an FM/AM receiving antenna 18 is supplied to the tuner unit 14. A reception signal from a television antenna 19 is also supplied to the tuner unit 14.

The CD unit 15 reproduces a compact disc for music. An automatic changer 21 is attached to the CD unit 15. A desired disc is selected by the auto changer 21 and the disc is reproduced by the CD unit 15.

The GPS unit 16 measures the present position by using satellites. A GPS antenna 20 is attached to the GPS unit 16. The present position of the vehicle is measured by the GPS unit 16. A decoder of a CD-ROM in which map information has been recorded is prepared in the main unit 12. The present location measured by the GPS unit 16 is displayed on the map.

In the above-mentioned system, the main unit 12 and power unit 13 are basic units. The tuner unit 14, CD unit 15, GPS unit 16 are optional units. The tuner unit 14, CD unit 15, GPS unit 16 can be selectively attached according to the user's interest. The tuner unit 14, CD unit 15, GPS unit 16 as optional units can be easily added or exchanged for the main unit 12 and power unit 13 as basic units.

It is, further, possible in the system to provide a rear display in order to also enable persons on rear seats to watch a picture or a wheel operating unit so that the user can operate various operations at a position near a steering wheel. In the above-mentioned example, although two speakers 17A and 17B are provided, further many speakers can be arranged.

As mentioned above, the console unit 11 is attached to the dashboard 102 and the other units (main unit 12 and power unit 13, and the tuner unit 14, CD unit 15, and GPS unit 16 as optional units) are attached to, for example, the trunk 103. Since the console unit 11 is attached to the dashboard 102, the user can easily set an operation while seeing the display of the console unit 11. Since the other units can be attached to the trunk 103, an enough attaching space can be assured.

Figure 3:
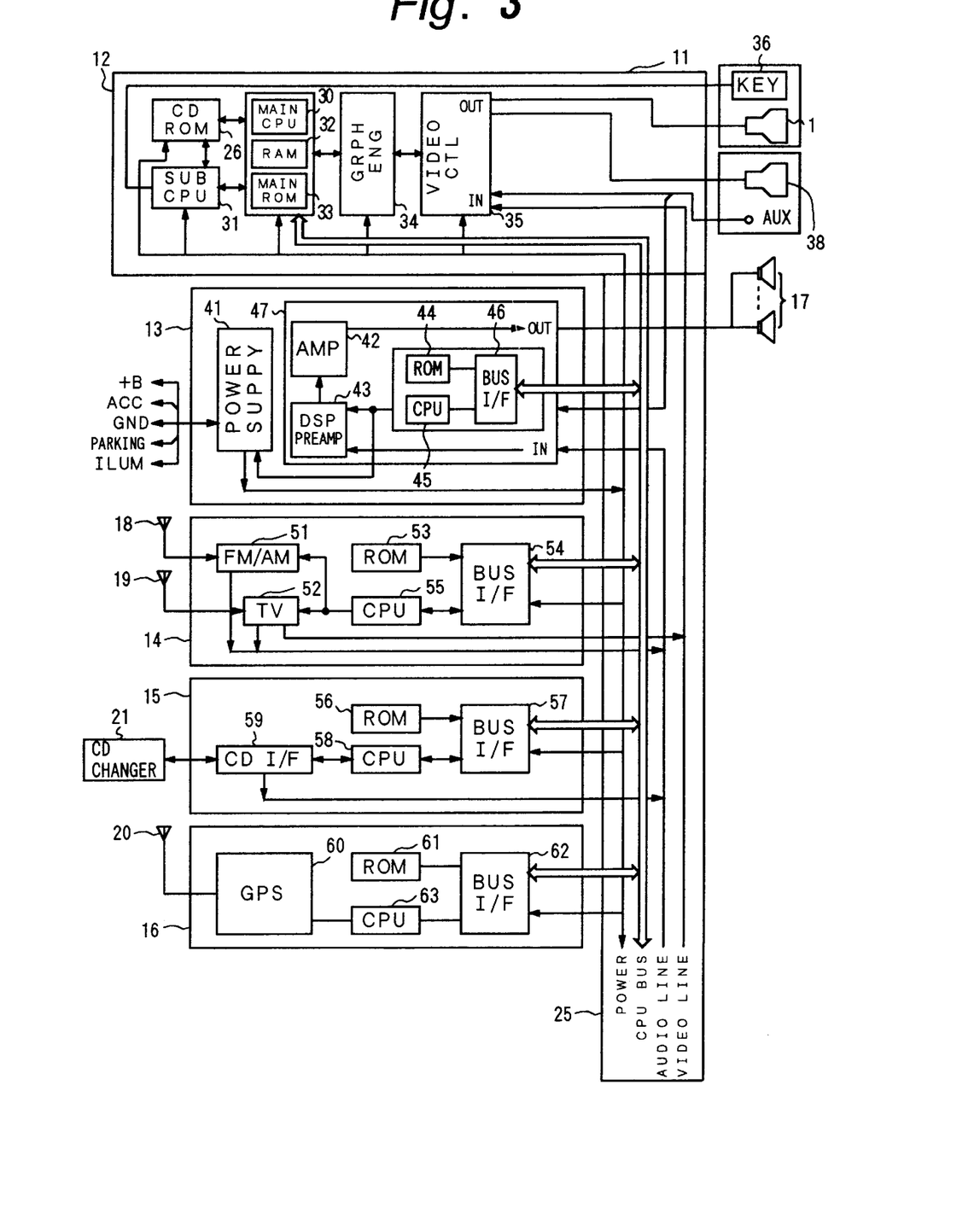
FIG. 3 is a block diagram showing a whole construction of the system to which the invention is applied.

FIG. 3 is a block diagram showing a specific construction of the system. In FIG. 3, a main CPU 30, a sub CPU 31, an RAM 32, an ROM 33, a graphic engine circuit 34, and a video control unit 35 are provided for the main unit 12. The main CPU 30 is a program executing unit which accesses the ROM 33 in the main unit 12 and ROMs 44, 53, 56, and 61 in the power unit 13, tuner unit 14, CD unit 15, and GPS unit 16 and executes each program and controls the main unit 12 and power unit 13 and also controls the tuner unit 14, CD unit 15, and GPS unit 16 as optional units.

The sub CPU 31 is an input control unit for controlling input data and performs: a power supply monitoring such as checks of an accessory switch of the vehicle and a battery voltage, and the like; an ON/OFF control of a power supply unit 41 in the power unit 13; an activation of the main CPU 30, a fetching of an input by the operation of operation keys 36 (constructed by the function keys $3_1$ to $3_6$, cursor keys 4A to 4D, display switching key 5, keys $6_1$ to $6_5$, and the like) in the console unit 11; an interruption control for the main CPU 30; a control of a CD-ROM player 26; and the like.

In the main ROM 33, is stored: what is called a system function group for performing an initialization, a fetching of an input from the operation keys 36, a display control of the graphics drawing, a video switching control, a fetching of data from the CD-ROM player 26, and the like; an electronic map function; and a mode transition control program for executing programs stored in the ROMs 53, 56, and 61 in the tuner unit 14, CD unit 15, and navigation unit 16 as optional units.

At the time of the initialization, information data of the connected optional units is inputted to the RAM 32. The RAM 32 is used as a work area for the main unit 12 and the tuner unit 14, CD unit 15, and navigation unit 16 as optional units.

The graphics engine circuit 34 enables all of displays such as display of the operating information to the liquid crystal display 1 of the console unit 11, display of the electronic map, display at the time of the navigation, and the like to be performed at a high speed. The video control unit 35 is an image display control unit for controlling a switching on the image output.

The CD-ROM player 26 has an electronic map display function and reads out data stored in the CD-ROM when drawing an electronic map which is necessary to perform the navigation.

A bus 25 is led out from the main unit 12. The bus 25 includes a CPU bus to transmit and receive data between the CPUs, audio lines to transmit audio signals, a video line to transmit a video signal, and a power supply line. The main unit 12, power unit 13, and the tuner unit 14, CD unit 15, and navigation unit 16 as optional units are connected through the bus 25.

The power unit 13 has the power supply unit 41, a power amplifier 42, a DSP preamplifier 43, the ROM 44, and a CPU 45. An interface unit 46 to connect to the bus 25 is also provided for the power unit 13. The CPU 45 of the power unit 13 and the CPU 30 of the main unit 12 are connected via a CPU bus of the bus 25.

A power source is supplied from a vehicle-mounted battery to the power supply unit 41. The power supply unit 41 stabilizes the power source from the battery. ON/OFF operations of the power supply unit 41 are controlled by the sub CPU 31 in the main unit 12 via the main CPU 30, CPU bus, CPU 45 of the power supply unit 41. The power source from the power supply unit 41 is supplied to the main unit 12 and the tuner unit 14, CD unit 15, and navigation unit 16 as optional units via a power supply line of the bus 25. The audio signals are supplied from the tuner unit 14 or CD unit 15 to the power unit 13 via audio lines of the bus 25. The audio signals are supplied to the DSP preamplifier 43. The DSP preamplifier 43 has an electronic volume for volume/balance/fader and is also provided with a parametric equalizer and a surround processor. Outputs of the DSP preamplifier 43 are supplied to the power amplifier 42. Electric powers of the audio signals are amplified by the power amplifier 42. Outputs of the power amplifier 42 are supplied to the speakers 17.

In this embodiment, the tuner unit 14, CD unit 15, and navigation unit 16 are provided as optional units.

The tuner unit 14 has an FM/AM tuner 51, a television tuner 52, the ROM 53, and a CPU 55. An interface unit 54 to connect to the bus 25 is also provided for the tuner unit 14. The CPU 55 of the tuner unit 14 and the CPU 30 of the main unit 12 are connected via the CPU bus of the bus 25.

The FM/AM antenna 18 is connected to the FM/AM tuner 51. A reception signal of an FM broadcast or AM broadcast is demodulated by the FM/AM tuner 51. The television antenna 19 is connected to the television tuner 52. A reception signal of a television broadcast is demodulated by the television tuner 52. The audio signals demodulated by the FM/AM tuner 51 or television tuner 52 are transmitted to the DSP preamplifier 43 of the power unit 13 via the audio lines of the bus 25 and are amplified by the power amplifier 42 and are supplied to the speakers 17A and 17B. The video signal demodulated by the television tuner 52 is transmitted to the video control unit 35 of the main unit 12 via the video line of the bus 25 and is displayed on the liquid crystal display 1 of the console unit 11 or a rear display 38.

A CD interface 59, the ROM 56, and a CPU 58 are provided for the CD unit 15. An interface unit 57 to connect to the bus 25 is also provided for the CD unit 15. The CPU 58 of the CD unit 15 and the CPU 30 of the main unit 12 are connected via the CPU bus of the bus 25.

The CD interface 59 of the CD unit 15 is connected to the CD changer 21. A plurality of discs are installed in the CD changer 21. A desired disc is selected from the discs in the CD changer 21. Reproduction outputs of the disc are transmitted to the DSP preamplifier 43 of the power unit 13 through the audio lines of the bus 25 and are amplified by the power amplifier 42 and are supplied to the speakers 17.

A GPS circuit 60, the ROM 61, and a CPU 63 are provided for the GPS unit 16. An interface unit 62 to connect to the bus 25 is also provided in the GPS unit 16. The CPU 63 of the GPS unit 16 and the CPU 30 of the main unit 12 are connected via the CPU bus of the bus 25. The GPS antenna 20 is connected to the GPS circuit 16. The present position is measured by the GPS circuit 16 by using satellites. The present position data is transmitted to the main unit 12 via the CPU bus of the bus 25. Map information is read out from the CD-ROM player 26 of the main unit 12. Graphics of the electronic map are formed on the basis of the map information by the graphics engine circuit 34. The present location from the GPS circuit 60 is plotted onto the map information and is displayed on the liquid crystal display 1 of the console unit 11.

Figure 4:
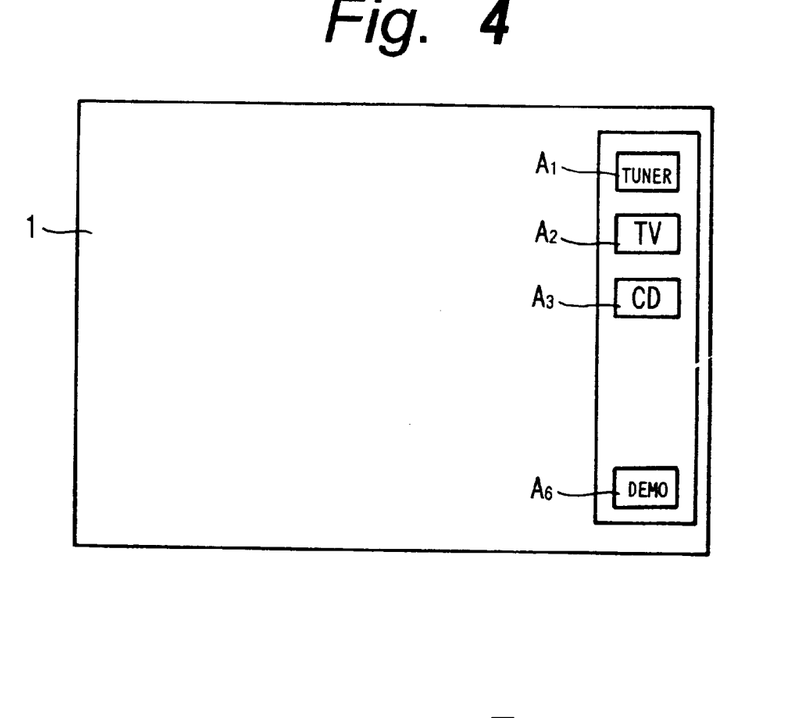
FIG. 4 is a schematic diagram which is used to explain a display in the system to which the invention is applied.

A display of the liquid crystal display 1 of the console unit 11 will now be described. FIG. 4 shows a display of the liquid crystal display 1 of the console unit 11 in an initial state. As shown in FIG. 4, in the initial state, guidance displays $A_1$, $A_2$, $A_3$, and $A_6$ of "tuner", "television", "CD", and "demonstration" are displayed as guidance displays for the function keys $3_1$, $3_2$, $3_3$, and $3_6$, (refer to FIG. 2). When the function key $3_1$ is depressed, the tuner functions. When the function key $3_2$ is depressed, a television receiver functions. When the function key $3_3$ is depressed, the CD player functions.

Figure 5:
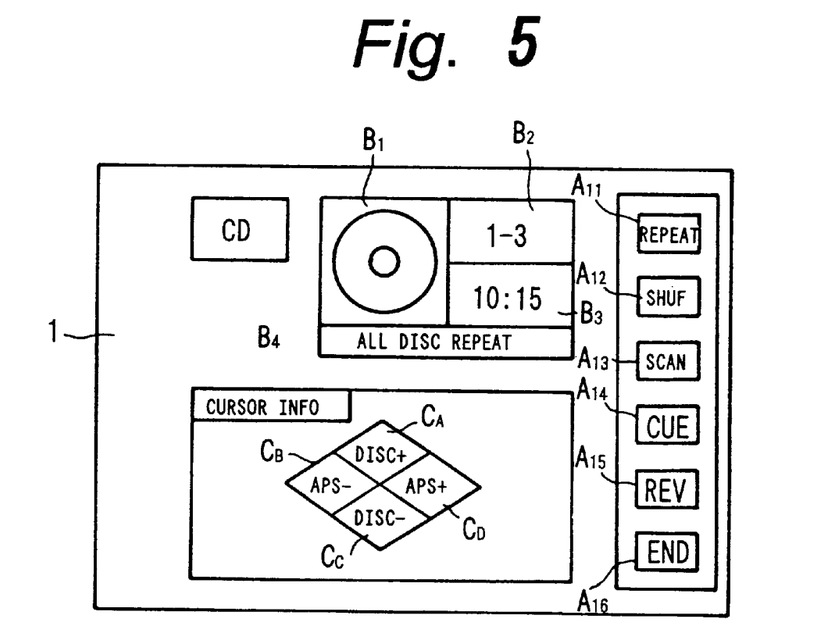
FIG. 5 is a schematic diagram which is used to explain the display in the system to which the invention is applied.

In this instance, for example, when the function key $3_3$ is depressed, a picture for reproducing the CD player as shown in FIG. 5 is displayed. That is, guidance displays $A_{11}$, $A_{12}$, $A_{13}$, $A_{14}$, $A_{15}$, and $A_{16}$ indicative of "repeat", "shuffle", "scan", "queue", "review", and "end" are displayed on the liquid crystal display 1 as guidance for the function keys $3_1$, $3_2$, and $3_3$, and $3_6$. In the upper portion of the liquid crystal display 1, a display $B_1$ indicative of the disc, a display $B_2$ indicative of the disc number and music piece number during reproduction, a display $B_3$ indicative of a reproducing time, a display $B_4$ indicative of a status such as repeat or the like are displayed. In the lower portion of the liquid crystal display 1, guidance displays $C_A$ to $C_D$ of the cursor keys 4A to 4D are displayed. When the cursor keys 4A to 4D are depressed, the operations corresponding to the guidance displays $C_A$ to $C_D$ are executed. Namely, when the cursor key 4A is depressed, the disc is changed to a one-subsequent disc. When the cursor key 4C is depressed, the disc is changed to a one-preceding disc. When the cursor key 4B is depressed, the music piece is changed to a one-preceding music piece. When the cursor key 4D is depressed, the music piece is changed to a one-subsequent music piece.

Figure 6:
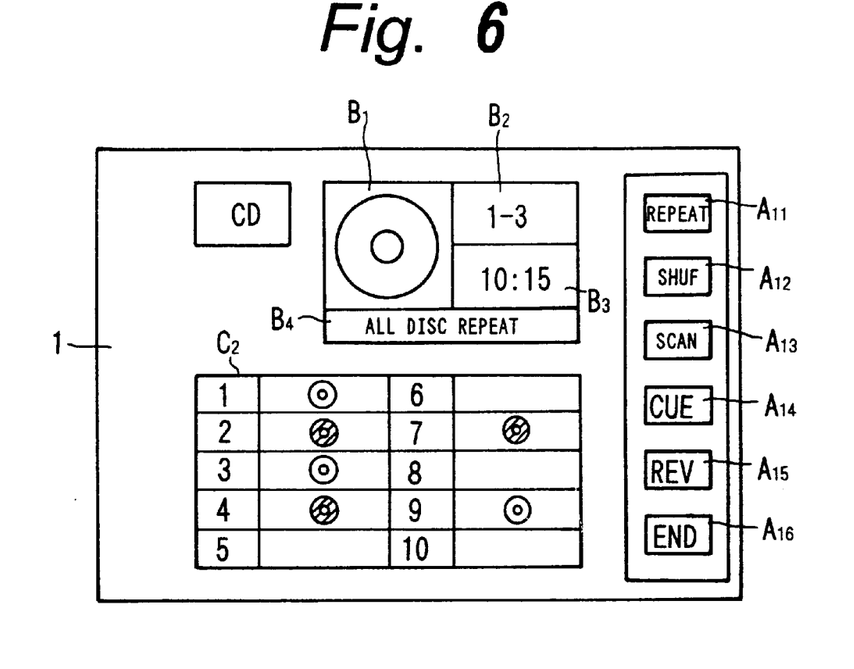
FIG. 6 is a schematic diagram which is used to explain the display in the system to which the invention is applied.
Figure 7:
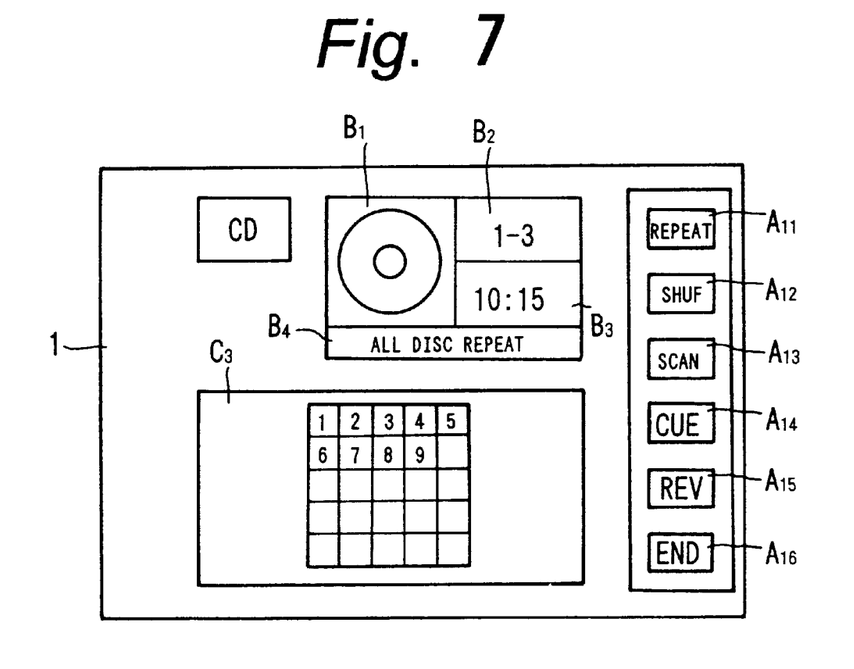
FIG. 7 is a schematic diagram which is used to explain the display in the system to which the invention is applied.
Figure 8:
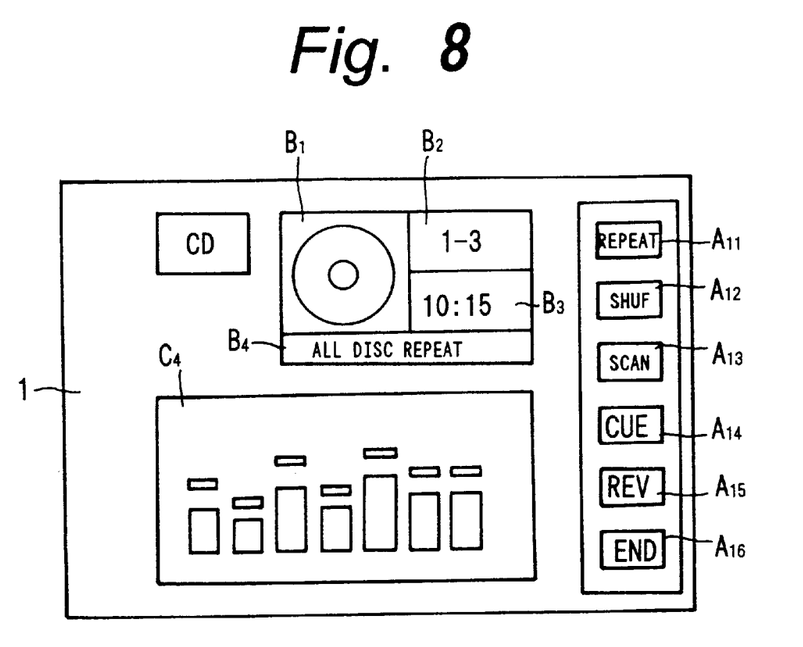
FIG. 8 is a schematic diagram which is used to explain the display in the system to which the invention is applied.

When the display switching key 5 (refer to FIG. 2) is depressed, the display is changed from the cursor displays $C_A$ to $C_D$ to a disc list display $C_2$ as shown in FIG. 6. The disc list display $C_2$ indicates where the disc exists in the disc changer 21. Further, when the display switching key 5 is depressed, the display is changed from the disc list display $C_2$ to a music calendar display $C_3$ indicative of the reproducing order of music pieces as shown in FIG. 7. When the display switching key 5 is depressed, further, the display is changed from the music calendar display $C_3$ to a spectrum analyzer display $C_4$ as shown in FIG. 8.

Figure 9:
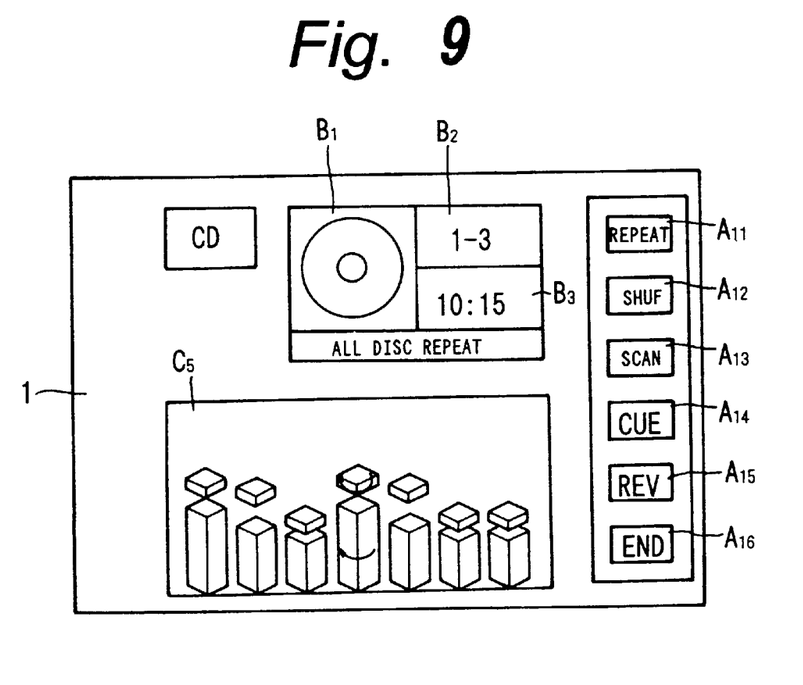
FIG. 9 is a schematic diagram which is used to explain the display in the system to which the invention is applied.
Figure 10:
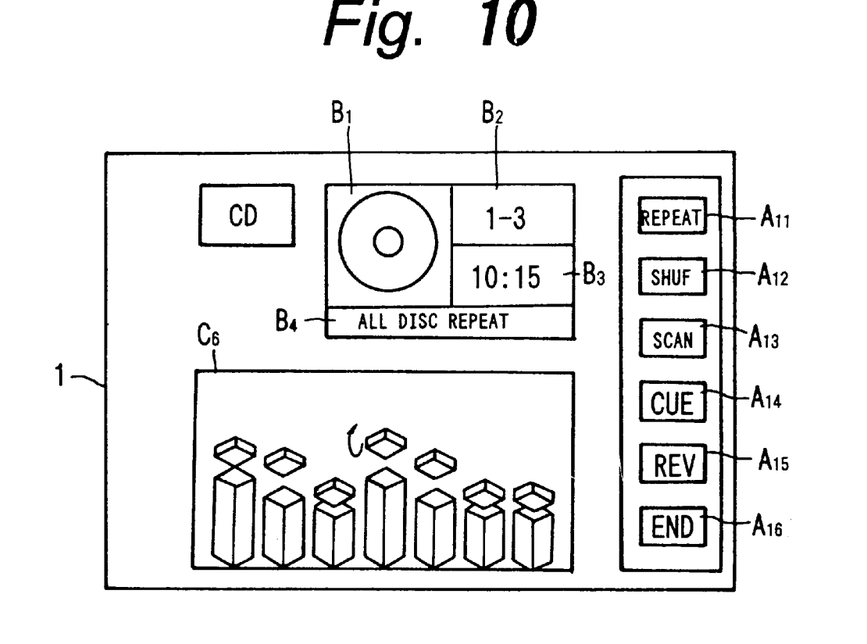
FIG. 10 is a schematic diagram which is used to explain the display in the system to which the invention is applied.
Figure 11:
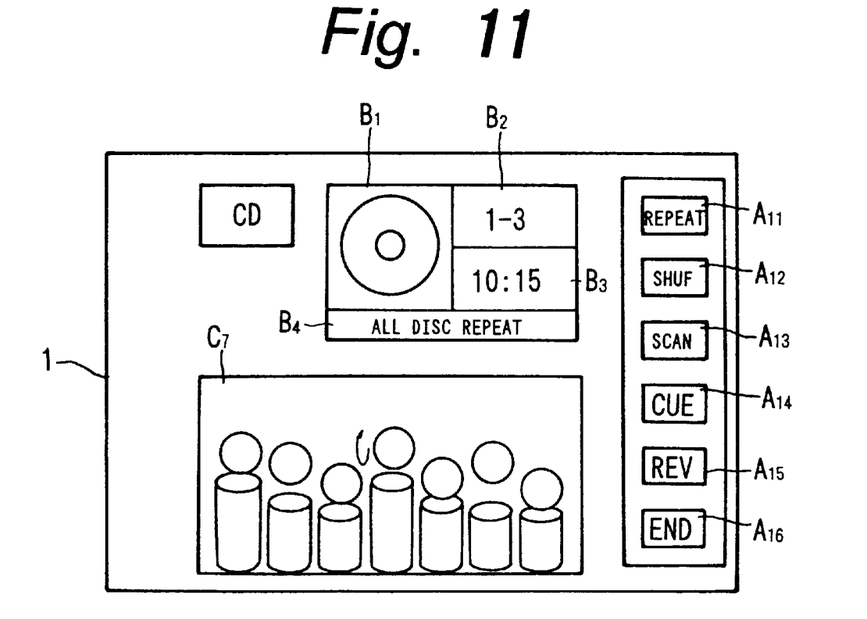
FIG. 11 is a schematic diagram which is used to explain the display in the system to which the invention is applied.

The spectrum analyzer display shows a level of each frequency component of the reproduction signal. As forms of the spectrum analyzer display, for example, four kinds of forms are prepared. Each time the display switching key 5 is depressed, the display is changed from the spectrum analyzer display $C_4$ of a bar graph display as shown in FIG. 8 to a spectrum analyzer display $C_5$ in which prisms are rotated as shown in FIG. 9, to a spectrum analyzer display $C_6$ in which the prisms are displayed and a peak prism jumps as shown in FIG. 10, and to a spectrum analyzer display $C_7$ in which cylinders are displayed and a peak cylinder jumps as shown in FIG. 11. When the display switching key 5 is further depressed, the display is returned to the cursor display as shown in FIG. 5.

Figure 12:
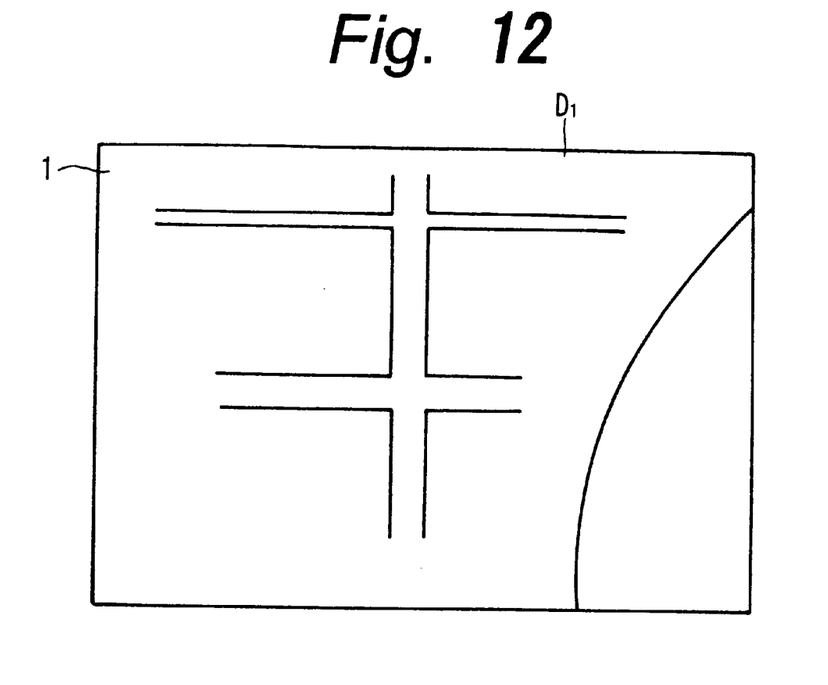
FIG. 12 is a schematic diagram which is used to explain the display in the system to which the invention is applied.

When the map key $6_1$ (refer to FIG. 2) is depressed during the reproduction of the disc, the display of the display 1 is switched from the current display to the display of a map $D_1$ for navigation as shown in FIG. 12. The apparatus is set into a mode such that the disc reproduction and the navigation are simultaneously executed.

Figure 13:
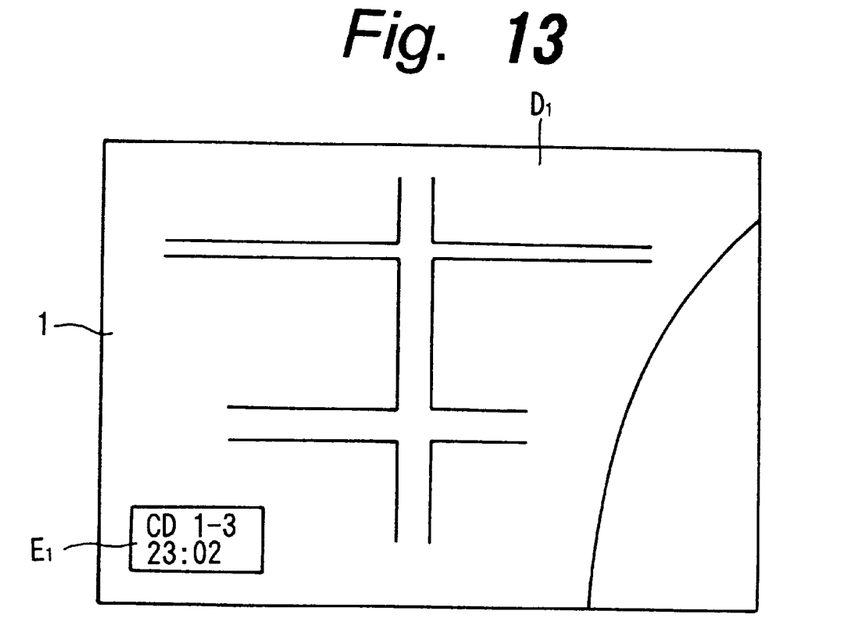
FIG. 13 is a schematic diagram which is used to explain the display in the system to which the invention is applied.

As mentioned above, in the state in which the map $D_1$ for navigation is displayed while reproducing the disc, when the display switching key 5 is depressed, as shown in FIG. 13, a window indicative of a display $E_1$ of the reproducing state of the disc is opened on the map $D_1$. The display $E_1$ shows, for example, the disc number, music piece number, and reproducing time.

Figure 14:
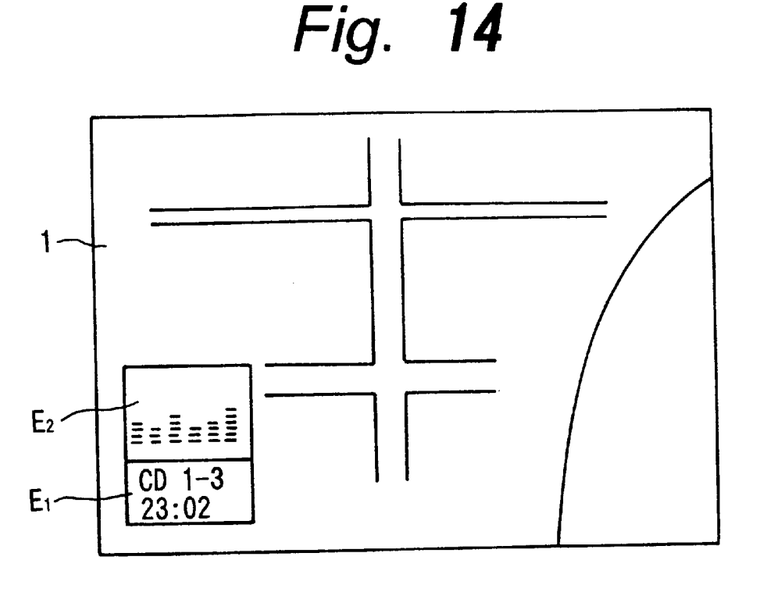
FIG. 14 is a schematic diagram which is used to explain the display in the system to which the invention is applied.

When the display switching key 5 is further depressed, as shown in FIG. 14, a window of a spectrum analyzer display $E_2$ is opened on the window of the display $E_1$ in the operation status of the disc player. When the display switching key 5 is further depressed, the display is returned to a picture in which the whole map $D_1$ for navigation as shown in FIG. 12 is displayed.

When the map key $6_1$ is further depressed in a state in which the disc reproduction and navigation are simultaneously performed, the display is returned to the original reproduction picture of the disc.

As mentioned above, in this embodiment of the present invention, when the map key $6_1$ is depressed during the reproduction of the disc, the map $D_1$ for navigation is displayed while the disc reproduction is continued. When the display switching key 5 is depressed, the display $E_1$ of the operation status of the disc player and spectrum analyzer display $E_2$ are superimposed onto the map $D_1$ and displayed. As mentioned above, since the display $E_1$ of the operation status of the disc player and spectrum analyzer display $E_2$ are superimposed onto the map and displayed, the operation status of the disc player can be confirmed while displaying the map for navigation.

Figure 15:
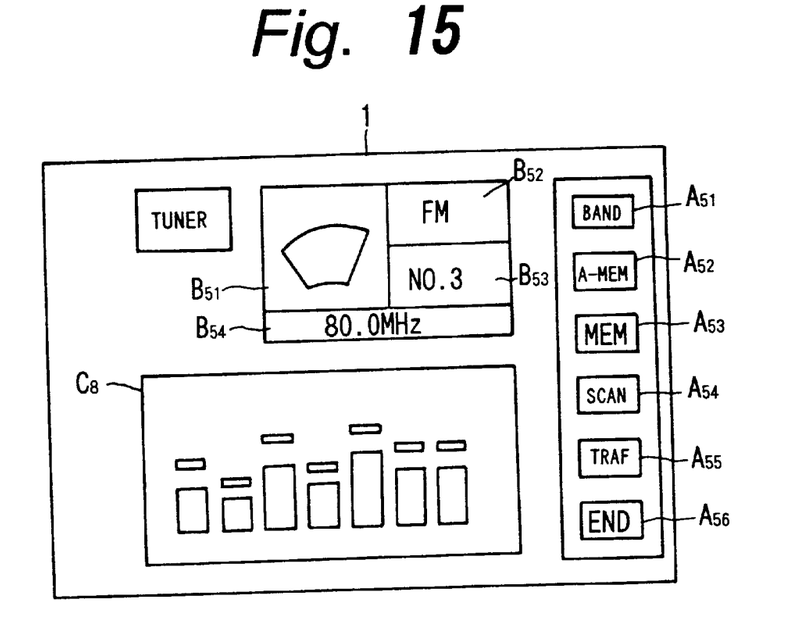
FIG. 15 is a schematic diagram which is used to explain the display in the system to which the invention is applied.

Not only in case of the disc reproduction but also in the case where the other devices are being operated, similarly, the operation status can be also confirmed while displaying the electronic map for navigation. That is, when the function key $3_1$ is depressed on the display picture plane in the initial state as shown in FIG. 4, the tuner functions. When the tuner functions, a display picture plane as shown in FIG. 15 appears. That is, guidance displays $A_{51}$, $A_{52}$, $A_{53}$, $A_{54}$, $A_{55}$, and $A_{56}$ indicative of "band", "A-memory", "memory", "scan", "traffic", and "end" are displayed on the liquid crystal display 1 as guidance for the function keys $3_1$, $3_2$, $3_3$, $3_4$, $3_5$, and $3_6$, respectively. In the upper portion of the liquid crystal display 1, a display $B_{51}$ indicative of a signal intensity measuring instrument, a display $B_{52}$ indicative of the FM/AM, a display $B_{53}$ indicative of the memory number, and a display $B_{54}$ indicative of a receiving frequency are displayed. In the lower portion of the liquid crystal display 1, a spectrum analyzer $C_8$ is displayed.

As mentioned above, during the operation of the tuner, when the map key $6_1$ is depressed, the display of the display 1 is switched from the current display to the display of the map for navigation. The apparatus is set to a state in which the broadcast reception and the navigation are simultaneously performed.

Figure 16:
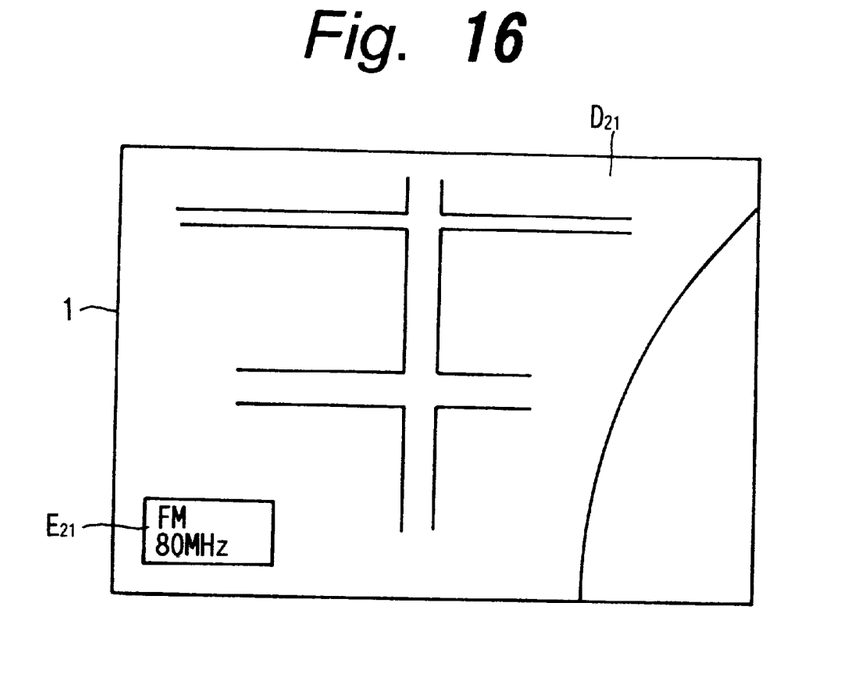
FIG. 16 is a schematic diagram which is used to explain the display in the system to which the invention is applied.

In the state in which the map for navigation is displayed while receiving the broadcast, when the display switching key 5 is depressed, as shown in FIG. 16, a window indicative of a display $E_{21}$ of a receiving state is opened on a map $D_{21}$. The display $E_{21}$ indicates, for example, an FM/AM mode and the receiving frequency.

Figure 17:
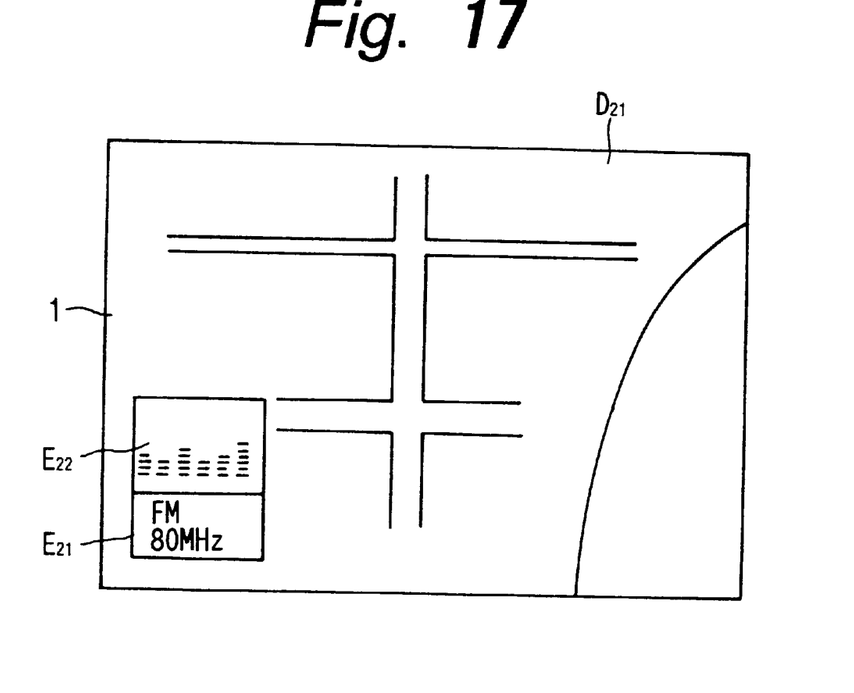
FIG. 17 is a schematic diagram which is used to explain the display in the system to which the invention is applied.

When the display switching key 5 is further depressed, as shown in FIG. 17, a window of a spectrum analyzer display $E_{22}$ is opened on the window of the display $E_{21}$ in the operation status of the disc player. When the display switching key 5 is further depressed, the display is returned to the picture plane in which the map is displayed as a whole.

In the state in which the broadcast reception and the navigation are simultaneously performed, when the map key $6_1$ is further depressed, the display is returned to the original tuner picture plane.

As mentioned above, in the embodiment of the invention, while displaying the map for navigation, the operation status of the CD player and the operation status of the tuner can be superimposed onto the map and displayed. Such a display is referred to as a simulcast display hereinbelow.

Figure 18:
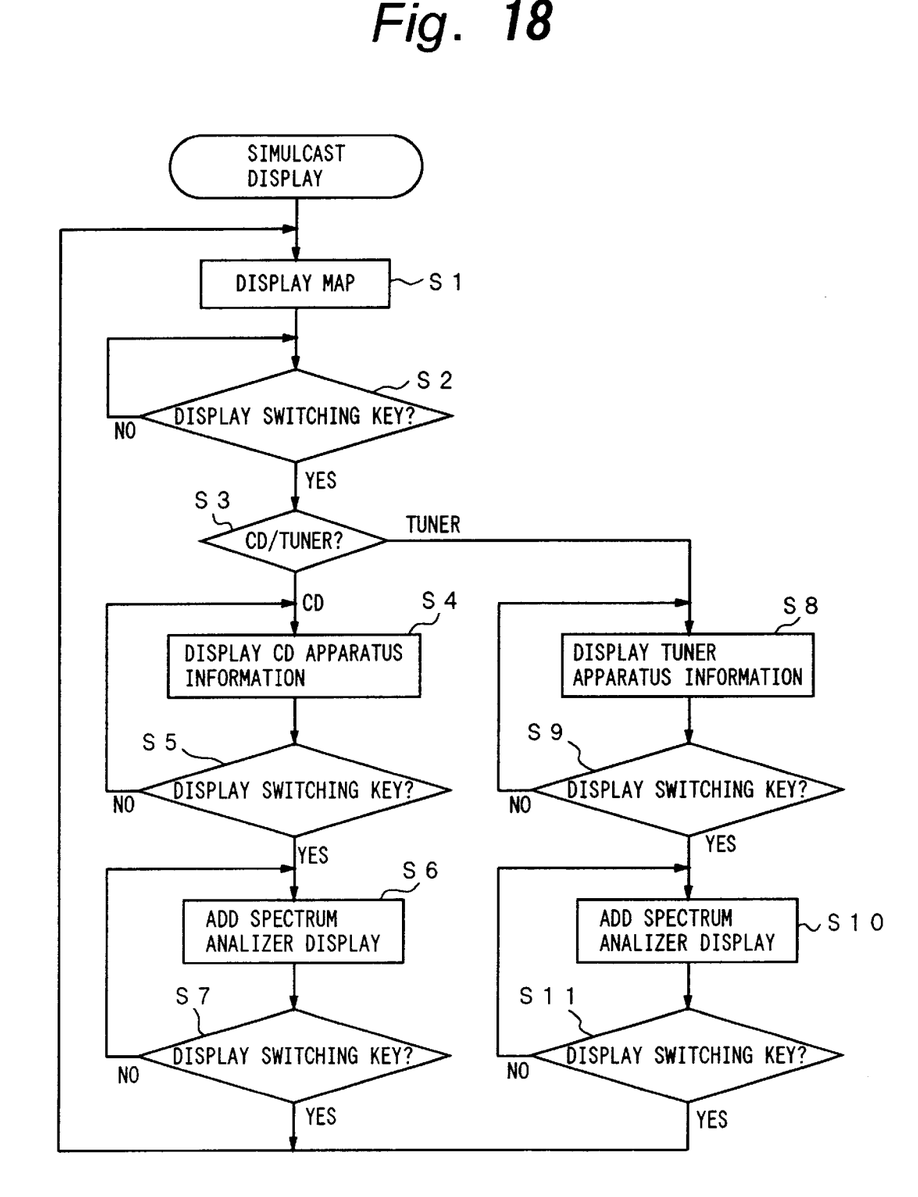
FIG. 18 is a flowchart which is used to explain the display in the system to which the invention is applied.

FIG. 18 is a flowchart showing a process of the simulcast display. In FIG. 18, when the display switching key 5 is depressed during the disc reproduction or the reception by the tuner, the apparatus enters a simulcast displaying process. In the simulcast displaying process, the electronic map for navigation is first displayed on the whole picture plane of the display 1 (step S1). A check is made to see if the display switching key 5 has been depressed (step S2). When the display switching key 5 is depressed, a check is made to see whether the apparatus during operation is the CD player 15 or tuner 14 (step S3).

If the apparatus during operation is the CD player 15, apparatus operating information regarding the CD is superimposed onto the map and displayed (step S4). Further, a check is made to see if the display switching key 5 has been depressed (step S5). When the display switching key 5 is depressed, the spectrum analyzer is superimposed and displayed in addition to the operating information regarding the disc reproduction (step S6). Further, a check is made to see if the display switching key 5 has been depressed (step S7). When the display switching key 5 is depressed, the processing routine is returned to step S1 and the map for navigation is displayed.

In step S3, if the apparatus during operation is the tuner 14, the apparatus operating information regarding the tuner is superimposed onto the map and displayed (step S8). Further, a check is made to see if the display switching key 5 has been depressed (step S9). When the display switching key 5 is depressed, the spectrum analyzer is superimposed and displayed in addition to the apparatus operating information regarding the tuner (step S10). Further, a check is made to see if the display switching key 5 has been depressed (step S11). When the display switching key 5 is depressed, the processing routine is returned to step S1 and the map for navigation is displayed.

Figure 19:
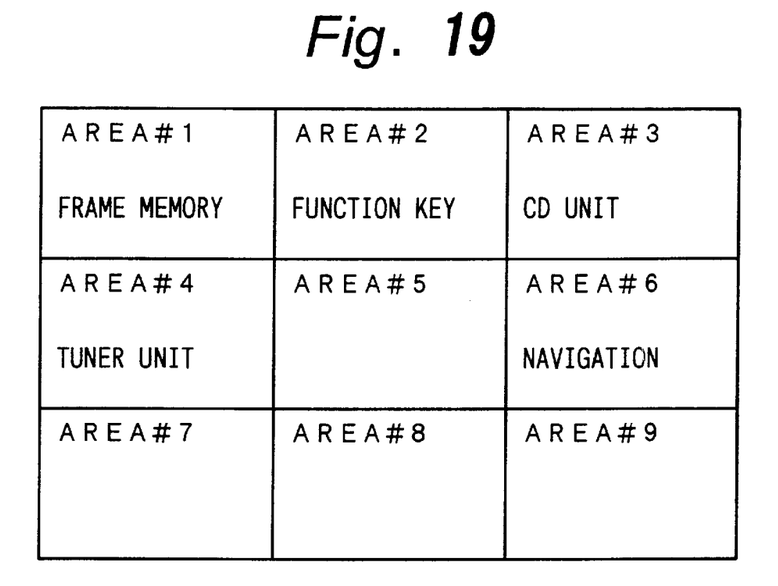
FIG. 19 is a schematic diagram which is used to explain a display apparatus to which the invention is applied.

FIG. 19 shows a construction of a video RAM provided for the graphics engine circuit 34. The video RAM is constructed by, for example, nine areas AREA# to AREA#9. With such a construction, the simulcast display can be easily realized.

That is, among the nine areas AREA#1 to AREA#9 in the video RAM, the area AREA#1 is used as a frame memory for displaying an actual picture plane and the other areas AREA#2 to AREA#9 are used as working memories for displaying the function keys and units. For example, the area AREA#2 is used as a working memory for displaying key guidance of the function keys or the like, the area AREA#3 is used as a working memory for displaying information of the operation of the CD unit 15, the area AREA#4 is used as a working memory for displaying information of the operation of the tuner unit 14, and the area AREA#6 is used as a working memory for displaying a map for navigation.

For example, when the map key $6_1$ is depressed during the CD reproduction and the apparatus enters the simulcast displaying process, the map information for navigation is formed in the area AREA#6 for navigation and the operating information is formed in the area AREA#3 for the CD unit.

In case of displaying only the map for navigation, the map information for navigation in the area AREA#6 is copied into the area AREA#1, so that the map for navigation is displayed.

In the case where the operating information of the CD unit 15 is superimposed onto the map for navigation and displayed, the operating information for the CD unit in the area AREA#3 for the CD unit is overwritten onto the area AREA#1. Therefore, the operating information of the CD unit is superimposed onto the map for navigation and displayed.

Figure 20:
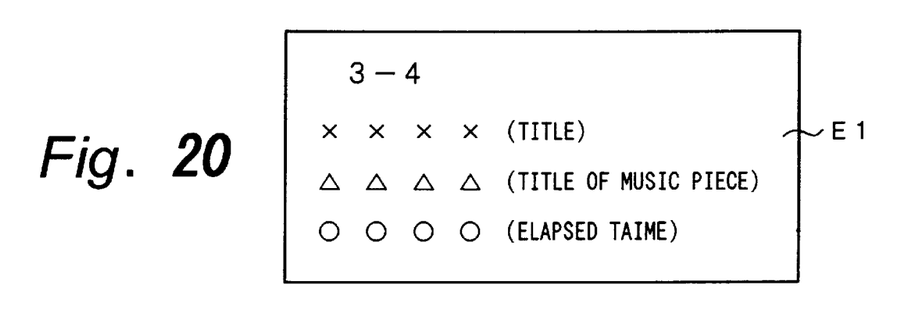
FIG. 20 is a schematic diagram which is used to explain another embodiment of the present invention.

In the above embodiment, the disc number, music piece numbers, and reproducing time are displayed as an operating display $E_1$ upon CD reproduction. In case of a disc such as an MD (mini disc) on which a title of the disc and names of music pieces can be recorded, as shown in FIG. 20, the title of the disc and the music piece names can be also displayed in addition to the disc number, music piece numbers, and reproducing time.

Figure 21:
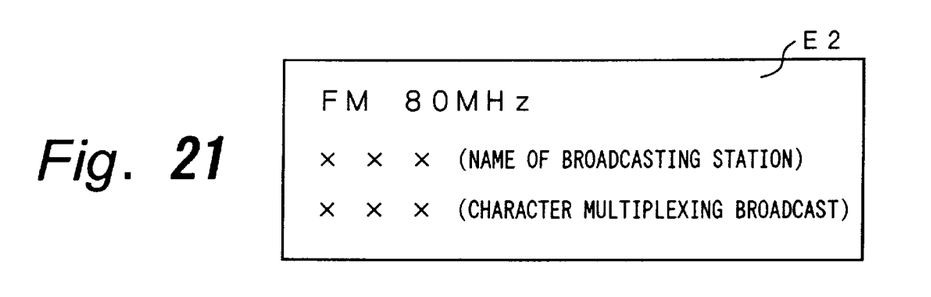
FIG. 21 is a schematic diagram which is used to explain further another embodiment of the present invention.

In the above embodiment, the mode of the FM/AM and the receiving frequency are displayed as an operating information display $E_2$ at the time of the reception by the tuner. As shown in FIG. 21, character information such as a received broadcasting station name, traffic information which is transmitted in association with the FM signal, and the like can be also displayed.

According to the invention, when performing the navigation while reproducing the disc, a display of the operation status of the disc player or analyzed level of each frequency component of the signal can be superimposed onto the electronic map for navigation. When performing the navigation while receiving the broadcast by the tuner, a display of the operation status of the tuner or analyzed level of each frequency component of the signal can be superimposed onto the map for navigation. Therefore, while displaying the electronic map for navigation, the operation of the disc player or operation status of the tuner can be confirmed easily.

What is claimed is:

1. A display apparatus for displaying information from a plurality of audio sources comprising:

first information generating means for generating an image of an electronic map showing streets for navigation from a memory on which map information including said streets is recorded and using a global positioning system (GPS) receiver that utilizes satellites to obtain a current location;

second information generating means for generating an image of information relating to one of said plurality of audio sources;

display means for selectively displaying said image of an electronic map showing streets for navigation and said image of information relating to one of said plurality of audio sources;

image mixing means for generating a mixed image for display on said displaying means from said image of an electronic map showing streets for navigation and information relating to one of said plurality of audio sources generated respectively by said first and said second information generating means, said image mixing means having a plurality of working memories for storing respective information relating to said plurality of audio sources and for storing said map information and having a frame memory so that said information to be displayed is copied into said frame memory to form said mixed image, wherein said mixed image is formed of said image of information relating to one of said plurality of audio sources superimposed on said image of an electronic map showing streets for navigation; and a display switching key connected to said image mixing means for causing said image of information relating to one of said audio sources to be superimposed on said image of an electronic map showing streets for navigation upon a user first depressing said display switching key while said image of an electronic map showing streets for navigation is being displayed on said displaying means and upon the user next depressing said display switching key additionally displaying a frequency analysis image and upon the user next depressing said display switching key displaying only said image of an electronic map showing streets for navigation, wherein said navigation allows a user to navigate from a street of the current location to a street of a destination.

2. The display apparatus for displaying information from a plurality of sources as claimed in claim 1, wherein said image of information relating to one of said plurality of sources is an image representing an operation status of an audio and/or video equipment forming one of said plurality of sources.

3. An audio-video navigation system for displaying information from a plurality of audio sources simultaneously, comprising:

displaying means for displaying an image;

navigation means for generating a first image of a map showing streets representing navigating information from a memory in which map information including said streets is recorded and using a global positioning system (GPS) receiver which utilizes satellites to obtain a current location;

audio-video operating means for generating a second image representing an operation status of an audio and/or video equipment forming one of said plurality of audio sources; and image mixing means for generating a mixed image from said first image of a map showing streets representing navigating information and said second image representing an operation status generated respectively by said navigation means and said audio-video operating means for display by said displaying means, said image mixing means having a plurality of working memories for storing respective information relating to said plurality of audio sources and for storing said map information and having a frame memory so that said information to be displayed is copied into said frame memory to form said mixed image, wherein said mixed image is formed of said second image representing an operation status superimposed on a section of said first image of a map showing streets representing navigating information; and a display switching key for causing said second image representing an operation status to be superimposed on said first image of a map showing streets representing navigation information upon a user first depressing said display switching key when said first image of a map showing streets representing navigating information is being displayed on said displaying means and upon the user next depressing said display switching key additionally displaying a frequency analysis image and upon the user next depressing said display switching key displaying only said image of a map showing streets representing navigating information;

wherein said navigation allows a user to navigate from a street of the current location to a street of a destination.

4. The audio-video navigation system for displaying information from a plurality of sources simultaneously as claimed in claim 3, wherein said audio and/or video equipment is a disc reproducing apparatus.

5. The audio-video navigation system for displaying information from a plurality of sources simultaneously as claimed in claim 3, wherein said audio and/or video equipment is a receiving apparatus.

6. The audio-video navigation system for displaying information from a plurality of sources simultaneously as claimed in claim 4, wherein said second image representing said operation status of said disc reproducing apparatus includes an image representing a frequency analysis of an output signal of said disc reproducing apparatus.

7. The audio-video navigation system for displaying information from a plurality of sources simultaneously as claimed in claim 5, wherein said second image representing said operation status of said receiving apparatus includes an image representing a frequency analysis of an output signal of said receiving apparatus.

8. A car with an audio-video navigation system for displaying information from a plurality of audio sources simultaneously, comprising:

displaying means located in the car for displaying an image;

navigation means located in the car for generating a first image of a map showing streets representing navigating information, wherein said first image is generated from a memory in which map information including said streets is recorded and using a global positioning system (GPS) receiver that utilizes satellites to obtain a current location;

audio-video operating means located in the car for generating a second image representing an operation status of an audio and/or video equipment forming one of said plurality of audio sources; and image mixing means located in the car for generating a mixed image from said first image of a map showing streets representing navigating information and said second image representing an operation status generated respectively by said navigation means and said audio-video operating means, said image mixing means having a plurality of working memories for storing respective information relating to said plurality of audio sources and for storing said map information and having a frame memory so that said information to be displayed is copied into said frame memory to form said mixed image, wherein said mixed image is formed of said second image representing said operation status of said audio and/or video equipment superimposed on a section of said first image of a map showing streets representing navigating information; and a display switching key connected to said image mixing means for causing said second image representing an operation status to be superimposed on said first image of a map showing streets representing navigating information upon a user first depressing said display switching key while said first image of a map is being displayed on said displaying means and upon the user next depressing said display switching key additionally displaying a frequency analysis image and upon the user next depressing said display switching key displaying only said image of a map showing streets representing navigating information, wherein said navigation allows a user to navigate from a street of the current location to a street of a destination.

9. A method for use in an audio-video navigation system for displaying information including displaying means for displaying an image, a display switching key, navigation means for generating navigating information, an audio-video operating means for generating an image of an operation status and image mixing means for generating a mixed image from said navigation means and said audio-video operating means, the method for displaying an image of said navigating information and said image of said operation status, comprising the steps of:

generating navigating information using said navigation means from a memory in which map information including streets is recorded and using a global positioning system (GPS) receiver which utilizes satellites to obtain a current location;

generating and displaying an image of said navigating information as an electronic map showing said streets using said displaying means when a predetermined key is operated by a user of the system; and generating said image of said operation status;

generating said mixed image by storing information relating to said image of said operation status and said map information in a plurality of working memories and by copying said information to be displayed into a frame memory to form said mixed image;

displaying said image of said operation status superimposed on a section of said image of said navigating information upon first operating said display switching key by the user and additionally displaying a frequency analysis image upon the user next operating said display switching key and displaying only said navigating information upon next operating said display switching key, wherein said navigation allows a user to navigate from a street of the current location to a street of a destination.

10. A method for displaying information from a plurality of audio sources comprising the steps of:

generating a first image of a map showing streets for navigation based on first information from a first information source from a memory in which map information including said streets is recorded and using a global positioning system (GPS) receiver that utilizes satellites to obtain a current location;

generating a second image based on second information relating to an operation status of one of said plurality of audio sources from a second information source;

displaying said first image of a map showing streets for navigation including data obtained from said global positioning system receiver;

mixing said first image of a map showing streets for navigation and said second image relating to an operation status of said plurality of audio sources for forming a mixed image by storing respective information relating to said plurality of audio sources and said map information in a plurality of working memories and by copying said information to be displayed into a frame memory to form said mixed image, wherein said second image relating to an operation status of said plurality of audio sources is superimposed on a section of said first image of a map showing streets for navigation;

first operating a display switching key;

displaying said mixed image; next operating said display switching key;

additionally displaying a frequency analysis image;

next operating said display switching key; and displaying only said first image of a map showing streets for navigation, wherein said navigation allows a user to navigate from a street of the current location to a street of a destination.

* * * * *